Sept. 27, 1932.  A. B. BELL  1,879,035
COLLAPSIBLE ARM REST FOR SEATS
Filed June 3, 1929   2 Sheets-Sheet 1
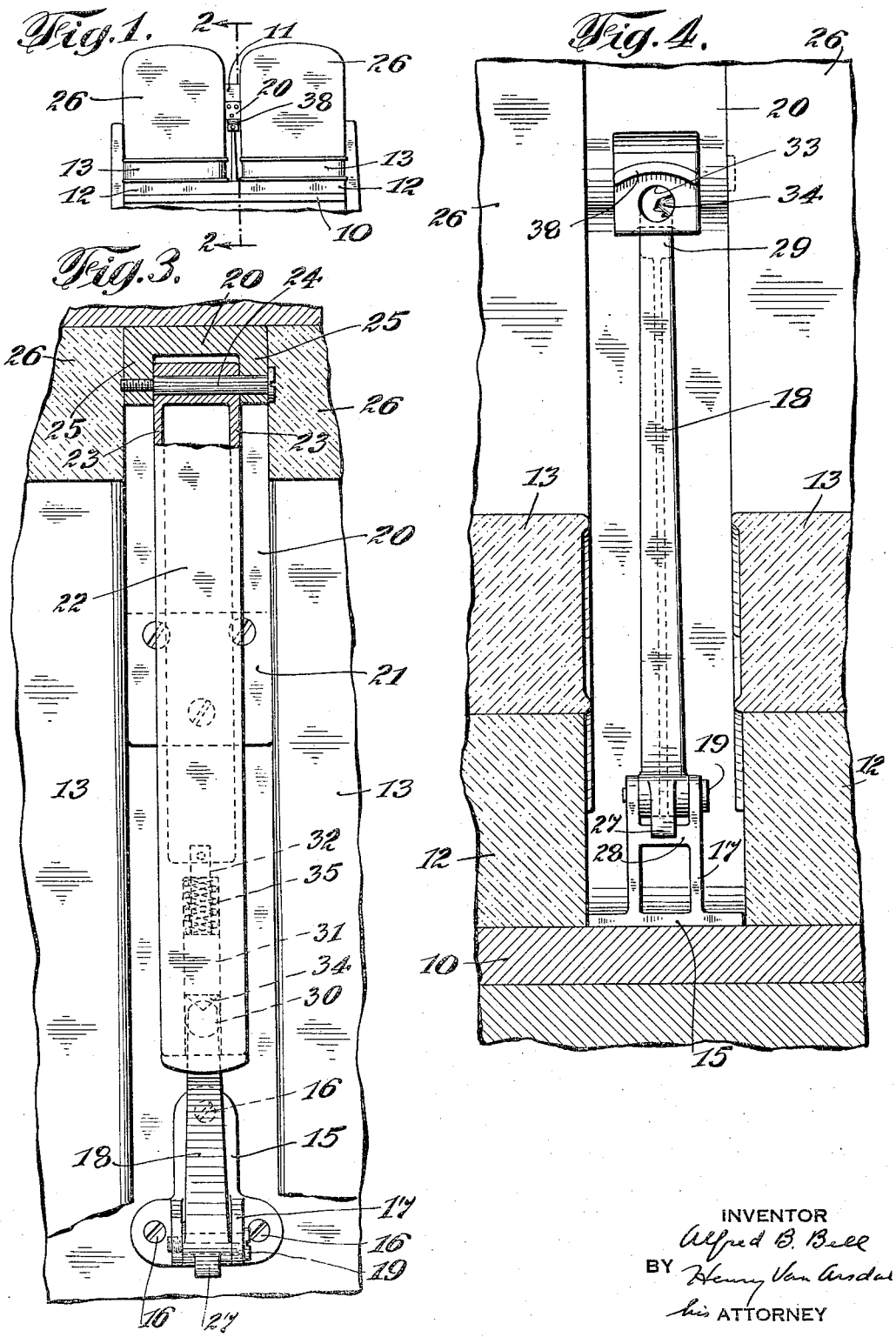

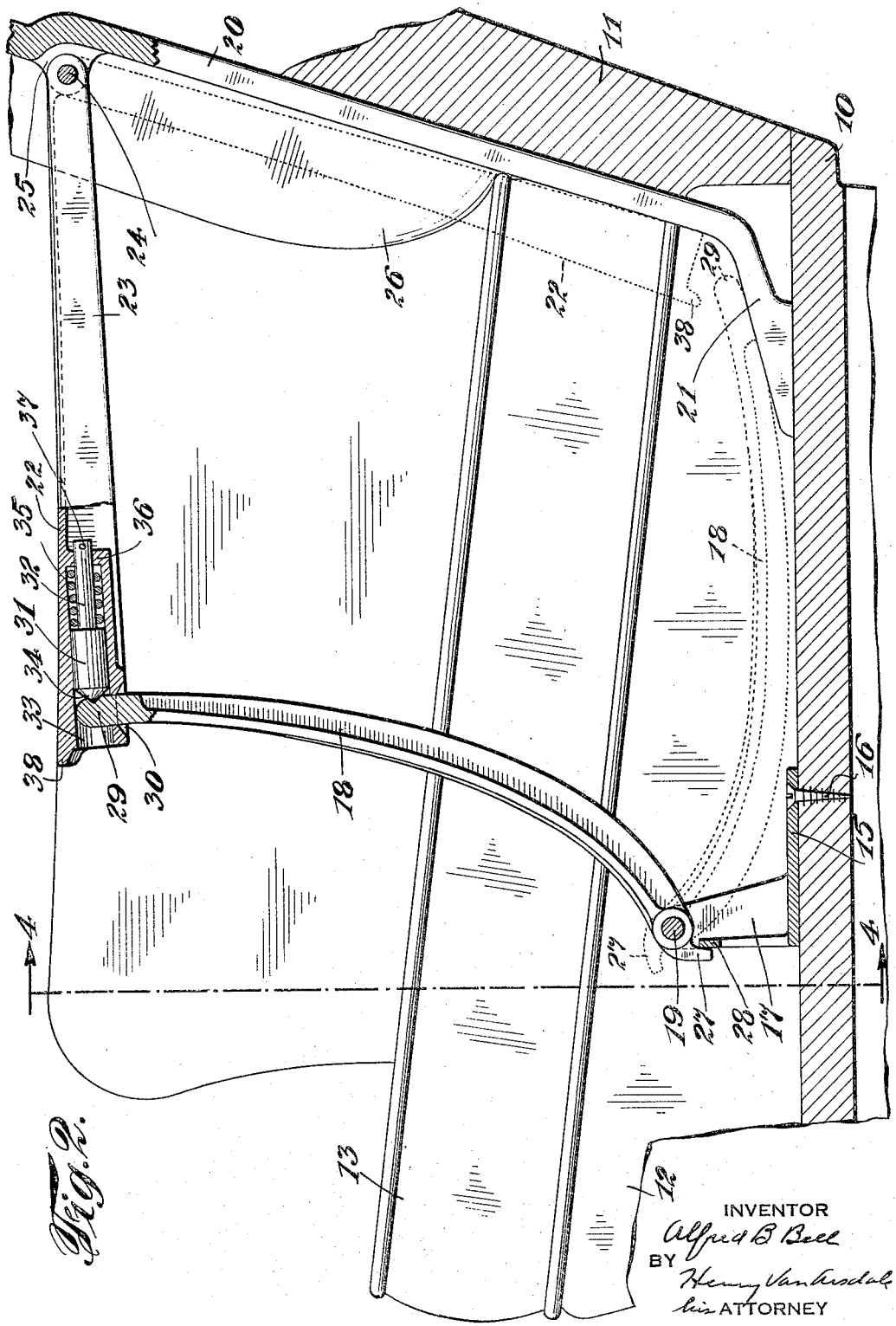

Patented Sept. 27, 1932

1,879,035

UNITED STATES PATENT OFFICE

ALFRED B. BELL, OF PHILADELPHIA, PENNSYLVANIA, ASSIGNOR TO HALE & KILBURN CO., OF PHILADELPHIA, PENNSYLVANIA, A CORPORATION OF DELAWARE

COLLAPSIBLE ARM REST FOR SEATS

Application filed June 3, 1929. Serial No. 367,969.

This invention relates to collapsible arm rests for seats, and more particularly to a collapsible arm rest adapted to separate the individual passengers occupying the same double seat in railway coaches, busses, tram cars and vehicles in general.

When two persons occupy a double seat an arm rest between the individual seat cushion usually adds to the comfort of the occupants and insures to each occupant his allotted share of the seat. However, when the seat is occupied by only one person, it is more comfortable if the intermediate arm rest were not present and the whole length of unobstructed seating space were available to the sole occupant. Often friends sitting together prefer double seats without intermediate arm rests.

An object of this invention is to provide a collapsible arm rest especially adapted for use in public conveyances, which can be collapsed into the seat to be completely out of the way, and which can be easily erected into arm supporting position by the seat occupant.

Another object of this invention is to provide a seat for a plurality of passengers, having a collapsible arm rest which is adapted to be folded completely between the individual seat cushions and seat back cushions, and one which requires only a very narrow space between the adjacent seat cushions and back cushions.

Another object of this invention is to provide a collapsible arm rest for vehicle seats which is sturdy and strong in construction, and which can be easily and quickly erected or collapsed by the passenger.

Other objects of my invention will be in part obvious and in part pointed out hereinafter.

In accordance with my invention, my collapsible arm rest comprises generally an arm rest member hinged to the seat back frame between the back cushions and a supporting member hinged to the cushion rest between the adjacent seat cushions. When raised, the free ends of these members are adapted to meet and to be latched together, thus establishing an arm rest structure between the individual seats. When unlatched and lowered these members are adapted to remain by gravity between the cushions of the seat back and seat.

In order that a clearer understanding of my invention may be had, attention is hereby directed to the accompanying drawings forming a part of and illustrating certain possible embodiments of my invention.

Referring to the drawings, Figure 1 is a front view of a double vehicle seat showing my improved collapsible arm rest in erected position between the individual cushions;

Figure 2 is an enlarged transverse vertical cross-sectional view through the vehicle seat and collapsible arm rest, taken on line 2—2 of Figure 1, showing in full lines the arm rest in erected position and in dotted lines the arm rest in lowered or collapsed position;

Figure 3 is an enlarged top plan view of a seat with my collapsible arm rest thereto attached, certain parts being broken away to more clearly show the construction; and Figure 4 is an enlarged front view of the seat and my collapsible arm rest thereto attached, certain parts of the seat being shown in cross section, taken on line 4—4 of Figure 2.

Similar reference characters refer to similar parts throughout the several views of the drawings.

Referring to the drawings, I have shown in Figure 1, a double seat of the type adapted for use in railway coaches and busses. However, it is understood that my collapsible arm rest may be used in association with any seat, and I do not limit myself to the use only in connection with railway car seats and bus seats as shown. Furthermore, my collapsible arm rest may also be used at the end of a seat, if desired, for instance, to facilitate the entrance of passengers into or out of the seat.

For purposes of illustration only, therefore, I show a seat cushion frame 10 adapted to support a plurality of passengers. A back rest frame 11 is secured thereto. The seat cushion frame is adapted to support a spring assembly 12 of well-known construction, enclosed within a suitable casing. The top surface of the spring assembly may be inclined rearwardly in the well-known manner to give a comfortable inclination to the individual seat cushions 13 supported thereon.

An attaching bracket, cast into the form shown in Figures 2, 3 and 4, is positioned between the individual seat cushions, and rests upon the seat cushion supporting frame 10. The attaching bracket comprises generally a foot portion 15 secured to the supporting frame 10 by any suitable means, such as screws 16. A pair of upstanding attaching lugs 17 are provided to which the lower end of the post member 18 is hinged by means of a pin 19. The post member, as shown in Figure 2, is given a curved shape so that when collapsed it will rest upon the supporting frame 10 and lie between the seat cushions, so as to occupy the least possible space. To make room for the attaching bracket and to permit the post member to be fully collapsed against the supporting frame 10, it is necessary that a suitable channel be cut in the cushion assembly 12, as shown more clearly in Figure 4. This channel need not extend to the outer edge of the cushion assembly, but need be only of such length as to make room for the attaching bracket and post member.

The back rest frame is provided with a suitable vertical arm rest supporting bar 20, as shown more clearly in Figures 2, 3 and 4. The vertical supporting bar is provided with a foot portion 21 which is adapted to rest upon the supporting frame 10. The arm rest supporting bar 20 may also be secured to the back rest frame in any suitable manner.

The arm support member may be made of wood or metal, and is of such shape as to provide a comfortable supporting surface for the passenger's arm. If the arm support member is made of metal it may be cast in channel form to provide a top supporting surface 22 and side flanges 23, as shown more particularly in Figures 2 and 3. The arm support member is hinged at one end to the vertical supporting bar 20 by means of a pin 24 which extends through a pair of lugs 25 provided on the supporting bar. The hinge pin 24, as shown in Figure 3, may extend through one lug and through an opening in the arm support member and may be screwed to the other lug to present a complete assembled construction.

The arm support member is so shaped as to lie flatly against the vertical supporting bar 20 when in collapsed position. Individual back rest cushions 26 are provided to correspond with the individual seat cushions 13. When the arm support member is in collapsed position it is practically concealed between adjacent back rest cushions, and is so deeply positioned therebetween that a passenger could rest his back between the two cushions without discomfort. This is illustrated more clearly in Figure 2 where it is seen that the body contacting surfaces of the back rest cushions 26 and seat cushions 13 extend for a considerable distance beyond the collapsed arm rest member and post member.

The lower end of the post member 18 is provided with a projecting lug portion 27, which is adapted to engage the upstanding flange 28 of the bracket 17 when the post is swung to vertical position, thus limiting the maximum outward swinging movement of the post member. The upper end of the post member is preferably rounded off to present a stud portion 29, which will readily enter a socket or hole 30 provided in the end of the arm rest member. The receiving mouth of the socket may be bevelled or reamed, as shown in Figure 2, to facilitate the entrance of the stud portion into the socket.

To prevent the post member and arm support member from becoming disengaged due to the jolts of the vehicle, means are provided to resiliently hold the stud portion of the post member within the socket in the arm support member. A bolt member, having a head portion 31 and stem portion 32, is provided. This bolt member is adapted to reciprocate in a longitudinal cavity 33 provided in the arm support member. The head portion 31 of the bolt member is provided with a conical end 34, which is adapted to seat within a corresponding conical cavity in the side of the stud portion 29 of the post member. A compression spring 35, surrounding the stem portion 32 and positioned between the head portion 31 and the wall portion 36 of the arm support member operates to normally shoot the bolt member forwardly, and to keep the conical end thereof seated within the corresponding conical cavity in the end of the post member. A pin 37 extending through the stem portion 32 is adapted to engage the wall portion 36 to limit the forward movement of the bolt member.

Now it is seen that when the stud portion 30 of the post member is inserted within the cooperating socket in the end of the arm support member, a slight downward pressure on the arm rest member will cause the conical end of the bolt to ride over the rounded end of the post member and shoot into the conical hole in the side thereof. Likewise by a slight upward force exerted on the end of the arm support member, the conical end of the bolt will slip out of the conical hole in the end of the post member to permit the ready detachment of the arm support member therefrom. A finger grasp portion 38 may be provided in the arm support member to facilitate separation of the arm support member and post member.

It is now seen that I have provided a collapsible arm rest which is adapted to be readily erected, and when not needed can be collapsed so as to be almost completely concealed between adjacent seat cushions and back rest cushions. When my arm rest is collapsed, the vehicle seat can be crowded with any number of passengers without any part of the collapsed arm rest giving discomfort to the passenger seated thereover. When desired, my collapsible arm rest can be quickly erected by the passenger to separate himself from his co-passenger, or for any other purpose. It is furthermore seen that my collapsible arm rest is adapted to be attached to any form of seat, either to constitute an intermediate arm rest to separate passengers, or to constitute an end arm rest to facilitate, for example, the entrance of a passenger into the seat.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:

In combination with a vehicle seat having a seat cushion portion and a back rest portion, of a collapsible arm rest including an attaching lug secured to said seat cushion portion, a post member hinged at one end to said lug and adapted to lie substantially parallel with the seat cushion portion when in collapsed position, said post having a projecting portion adapted to engage said lug to limit the outward pivoting movement of the post member, and an arm support member hinged to said back rest portion and adapted to lie in a plane substantially parallel with said back rest portion when in collapsed position, said post and arm support member being detachably connected when the arm rest is erected.

This specification signed this 28th day of May, 1929.

ALFRED B. BELL.